US006612005B2

(12) United States Patent
Rivers

(10) Patent No.: US 6,612,005 B2
(45) Date of Patent: Sep. 2, 2003

(54) TIRE VALVE REMOVER

(76) Inventor: Kenneth Rivers, 115 W. Maple Ave., Wauconda, IL (US) 60084

( * ) Notice: Subject to any disclaimer, the term of this patent is extended or adjusted under 35 U.S.C. 154(b) by 0 days.

(21) Appl. No.: 09/974,183

(22) Filed: Oct. 10, 2001

(65) Prior Publication Data

US 2003/0066176 A1 Apr. 10, 2003

(51) Int. Cl.[7] .................................................. B23P 19/04
(52) U.S. Cl. ........................................ 29/221.5; 81/15.4
(58) Field of Search ................................ 29/221.5, 235, 29/213, 278, 280, 282, 283, 450, 451; 81/15.4

(56) References Cited

U.S. PATENT DOCUMENTS

| | | |
|---|---|---|
| 1,393,365 A | 10/1921 | Heil |
| 2,096,676 A | 10/1937 | Conrad |
| 2,417,360 A | 3/1947 | Heintzelman |
| 3,100,335 A | 8/1963 | Lea |
| 3,561,090 A | 2/1971 | Fritch |
| 3,718,057 A | 2/1973 | Berchtold |
| 3,852,839 A | 12/1974 | Blessing |
| 3,861,249 A | 1/1975 | Lindquist |
| 4,528,735 A | 7/1985 | Eastridge et al. |
| 5,097,580 A | 3/1992 | Story |
| 5,665,908 A | 9/1997 | Burkey et al. |
| 6,152,165 A | 11/2000 | Fukuda |

*Primary Examiner*—Robert C. Watson
(74) *Attorney, Agent, or Firm*—Niro Scavone Haller & Niro

(57) ABSTRACT

The present invention concerns a tire valve removal tool. The device has a body having a bore extending through the body. An internal stop is located in the body. As located in the body is an internally threaded portion for engaging the threaded portion of a valve stem. A plurality of exhaust vents are axially spaced apart along the body and are in communication with the bore. A plunger is slidably retained within the bore. The plunger has a handle at one end and a valve engaging means located at an opposing end for engaging the tire valve and rotating it for insertion or removal.

4 Claims, 1 Drawing Sheet

TIRE VALVE REMOVER

BACKGROUND OF THE INVENTION

The present invention relates to an apparatus for working with and removing tire valves. More specifically, the present invention concerns an apparatus which assists in the safe and secure removal of a tire valve.

SUMMARY OF THE INVENTION

In the course of repairing a tire it is often necessary to remove the valve located in the tire stem, or elsewhere, to rapidly deflate the tire or to bleed off excess pressure. In many instances, the pressure located inside the tire is considerable, often 200–300 pounds per square inch ("PSI") or more, especially in aircraft tires. This pressure is often enough to present a hazardous situation. For example, if the valve is not securely retained during removal, it could unexpectedly shoot out of the valve stem at high velocity. This may result in serious injury to persons and potential damage to equipment. This is especially true in aircraft maintenance where the aircraft tires are under high pressure and where lost or misplaced objects are unacceptable.

The present invention provides an apparatus and method to securely and safely remove a valve, even if under high pressure. The present invention does this by providing an elongated body having a first end and an opposingly located second end. A bore runs through the body from end to end and the first end is stepped so as to provide first and second stops. The second end is internally threaded for attachment to a tire stem. Also provided are a plurality of vents axially spaced along the body and in communication with the bore. A plunger is slidingly retained in the bore and is configured to engage and remove the tire valve. During removal the valve is secured within the bore so as to retain the valve during deflation of the tire.

DESCRIPTION OF THE DRAWINGS

These and other features, objects and advantages of the present invention will become apparent from the following description and drawings wherein like reference numerals represent like elements in several views, and in which.

DESCRIPTION OF THE PREFERRED EMBODIMENT

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
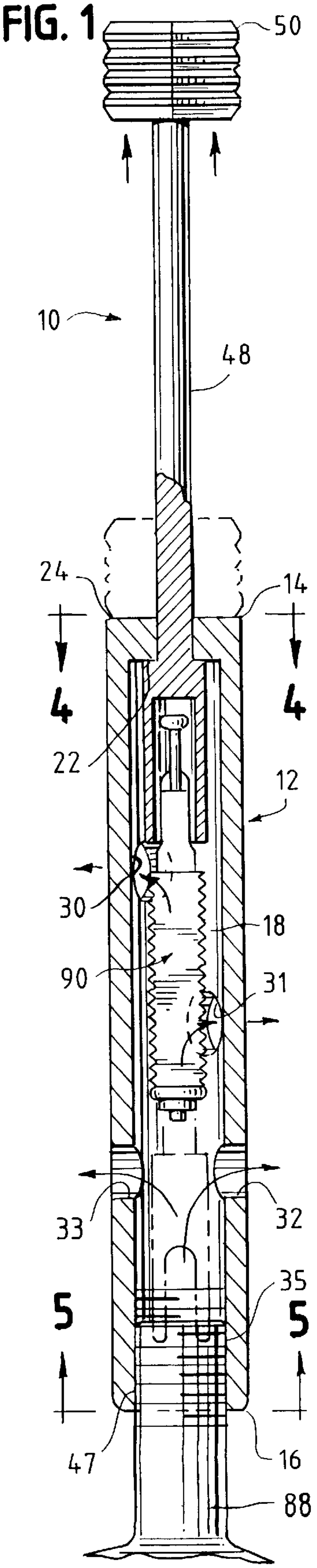
FIG. 1 is a partial side sectional view with portions removed to show various aspects of the invention.
Figure 2:
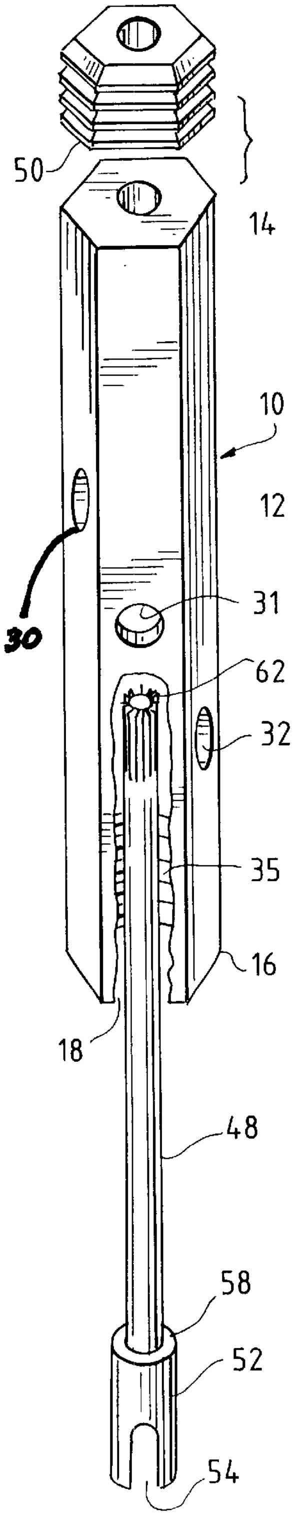
FIG. 2 is a perspective view with portions removed to show various aspects of the invention.
Figure 3:
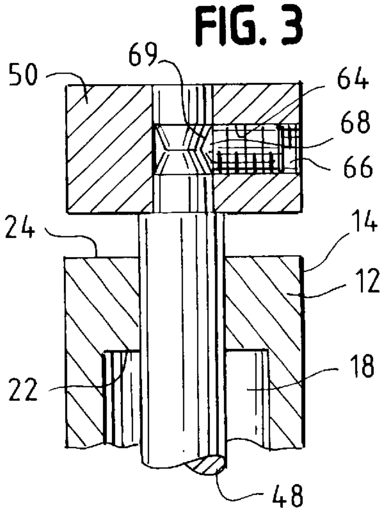
FIG. 3 is a sectional view illustrating how a handle may be attached to a plunger.
Figure 4:
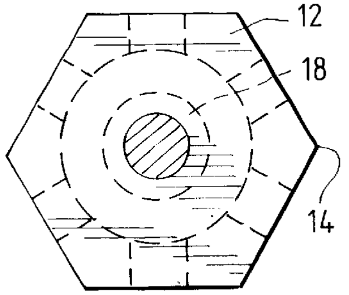
FIG. 4 is a top view.
Figure 5:
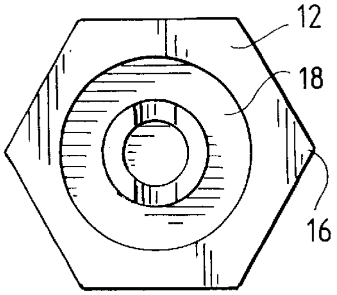
FIG. 5 is a bottom view.

As shown in FIGS. 1 and 2, the present invention is comprised of a tire valve removal apparatus 10. Included is an elongated body or base 12 having a first end 14 and opposingly located second end 16. A bore 18 extends through the body 12. An inner stop 22 and an outer stop 24 is formed at first end 14 by reducing the size of the bore at this location, as shown in FIGS. 1, 2 and 5.

Exhaust vents 30–34 are provided by axially spacing the vents along the body. Vents 30–34 are in communication with bore 18.

Internal threads 35 are located at second end 16. The threads are sized to receive the external threads 47 typically found on tire stem 88.

A plunger 48 is also provided. Located on one end of the plunger is a handle 50 and at the other end a valve engagement mechanism 52 which may include a slot 54 or be configured in some other manner so as to engage a tire valve 90. Plunger 48 also has an enlarged section 58 which is sized to engage inner stop 22.

Handle 50 may be threaded onto plunger 48 or secured by a friction fit through the use of flutes 62. In addition, handle 50 may include internal threads 64 which coact with set screw 66 to secure the handle to the plunger. Point 68 sets within beveled portion 69 for additional securement.

In use, the valve removal tool 10 is first attached to tire stem 88, by threading the tool onto the external threads of the stem through the use of internal threads 35. To assist in rotating the body, the body may be hexagonal in shape. This not only provides for an increased grip but also provides for use with a box or open-end type of wrench as well as other tools designed to work with the flat surfaces provided. As shown, each of the vent holes may be located on a flat surface so as to vent air in a radial pattern, which is helpful in dispersing debris which may be in the tire stem. Staggering the placement of the vents also limits the vents from being blocked when the device is gripped by hand or with a wrench.

Once the body of the tool is affixed to the stem, plunger 48 is moved into position so that valve 90 is engaged. The valve is rotated to remove it from the stem. Once the valve is released from its threaded engagement with the stem, pressurized air will escape from the tire.

Axially spacing the vents along the body assist in the valve removal operation in several ways. First, axially spacing the vents prevents overlength stems from blocking the vent. It also prevents debris, and gripping objects, from blocking the vents as described above. Lastly, staggering the vents maintains the structural integrity of the device. A plurality of holes in the same plane will significantly weaken the device. This is especially true when torque is applied to the device.

The interaction between enlarged portion or stop 58 and inner stop 22 prevent the valve or pressurized air from pushing the plunger out of the body. The interaction between handle 50 and stop 24 also prevents the plunger from falling out of the body.

Holding the valve within the bore of the body while pressurized air escapes through the exhaust vents provides a safe method to remove a valve. In addition, the internal threads 35 also act to secure the tool during the removal procedure, in that, the air pressure cannot cause the tool to inadvertently be blown away.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A tire valve removal tool comprising:

a body having a bore extending through said body;

an internal stop located in said body;

an internally threaded portion located in said body;

a plurality of exhaust vents, said vents axially spaced apart along said body in communication with said bore;

a plunger slidably retained within said bore, said plunger having a handle at one end and a valve engaging means located at an opposing end for engaging the tire valve and rotating it for insertion or removal.

2. The device of claim 1 wherein said body is comprised of flat surfaces.

3. The device of claim 1 wherein said body is hexagonally shaped.

4. The device of claim 2 wherein a vent hole is located on each of said flat surfaces.

* * * * *